(No Model.)
W. LEE.
COTTON PICKER.
No. 250,267. Patented Nov. 29, 1881.
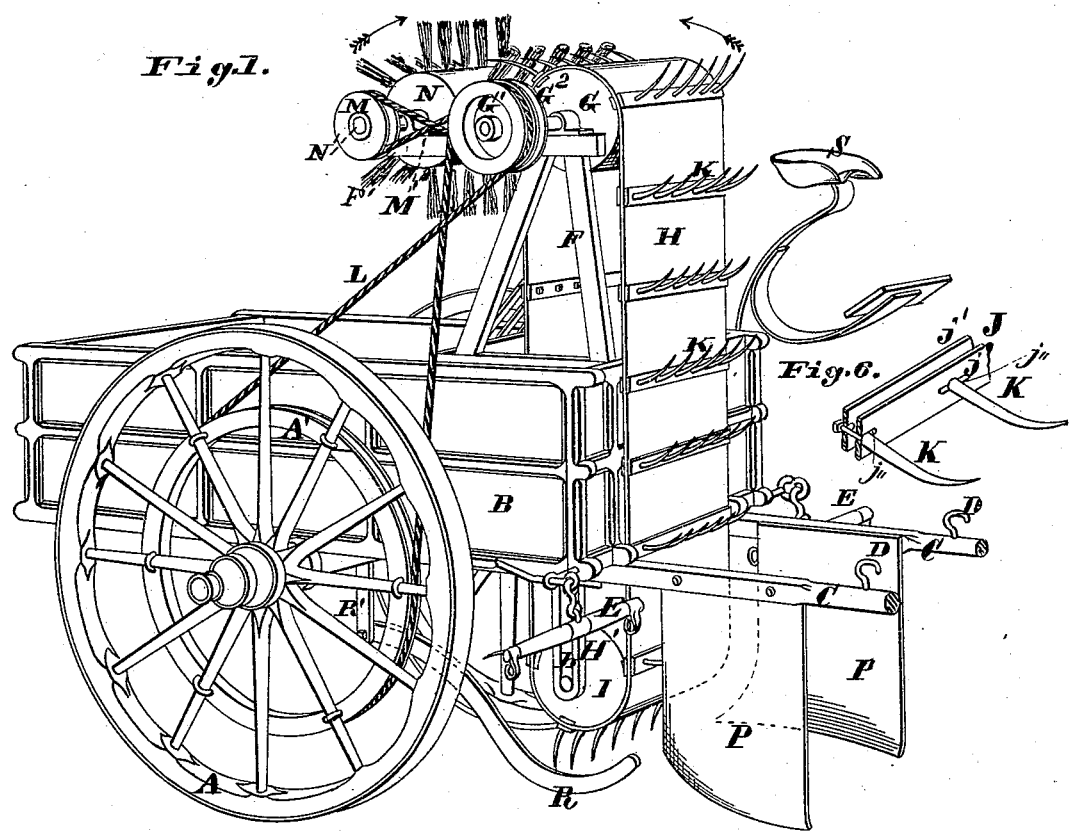
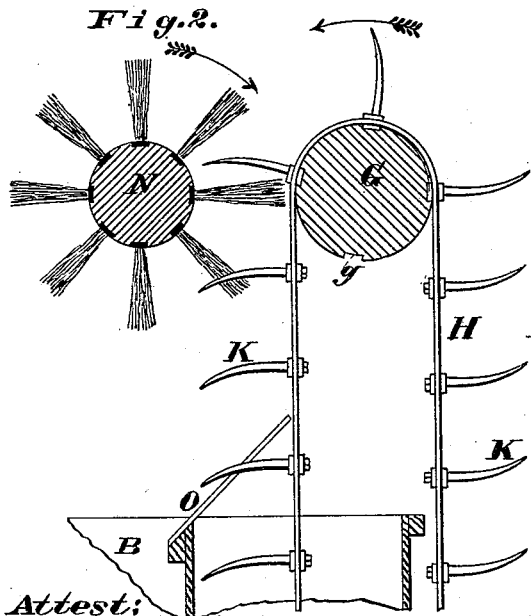
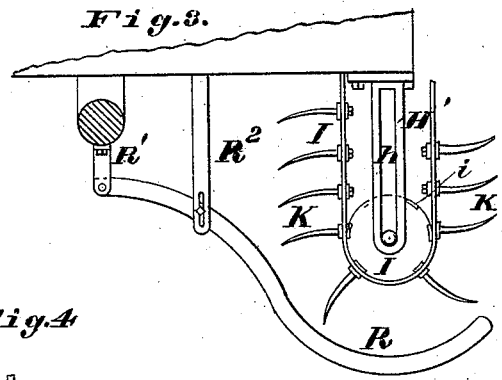
Attest:
Charles Pickles
Geo. H. Knight
Inventor:
William Lee.
By Knight Bros
Attys

UNITED STATES PATENT OFFICE.

WILLIAM LEE, OF ST. LOUIS, MISSOURI.

COTTON-PICKER.

SPECIFICATION forming part of Letters Patent No. 250,267, dated November 29, 1881.

Application filed February 28, 1881. (No model.)

*To all whom it may concern:*

Be it known that I, WILLIAM LEE, of the city of St. Louis, in the State of Missouri, have invented a certain new and useful Improvement in Cotton-Harvesters, of which the following is a full, clear, and exact description, reference being had to the accompanying drawings, forming part of this specification.

My invention relates to those machines for harvesting cotton which are provided with endless toothed belts and stripper-brushes.

My improvement consists in a compact form of harvester, consisting of a body to receive the picked material mounted on suitable wheels, standards on the forward end of the body, a roller mounted on the standards, hangers beneath the forward end of the body having slots, roller journaled in the slotted hangers, endless apron mounted on the rollers and carrying rakes, horizontal bars on the standards carrying a rotary brush and pulleys, and suitable belts connecting pulleys together and to a pulley on a wheel, all as hereinafter described.

My improvement consists, further, in providing a cotton-harvester with an endless belt provided with rake-teeth secured to the belt by means of a plate on each side and suitable nuts or by riveting, the outer plates being slotted to allow limited side play to the teeth and the belt being mounted on rollers recessed to receive the inner plates, as hereinafter described.

In the drawings, Figure 1 is a perspective view, illustrating my invention. Fig. 2 is a detail elevation of the rake-apron and clearing-brush. Fig. 3 is a detail elevation, showing the lower portion of the rake-apron and one of the runners by which the roots of the plants are weighted down. Fig. 4 is a front view, and Fig. 5 is a top view, of guides. Fig. 6 is an enlarged view of two rake-teeth.

I will show and describe my improvement as supported on a cart, but it will be equally applicable to a wagon. In the latter case it will be found better to drive the gathering mechanism by connecting it to one or both of the hind wheels.

A is a ground-wheel. B is the body of the cart. C C are the shafts or tongues, which extend forward parallel to each other and at a distance asunder, to allow space for the row of cotton between them. D D are hooks for the attachment of hames.

E E are single-trees, to which the draft-animals are hitched. Said animals are upon the outer side of the tongues C.

F is a standard, of which there is one upon each side of the vehicle, giving bearing to one end of the upper roller, G, having recesses $g$ for the back plate, $j'$, of the rake, upon which the endless apron H is supported. The lower or stretching roller, I, has gudgeons turning in vertical slots $h$ in the hangers H' and recesses $i$ for the inner plate, $j'$, of the rake, and is made of sufficient weight to stretch the apron.

The belt may be made of leather and may be twenty-one inches (more or less) in width. The rollers G and I may be five feet (more or less) asunder. The sides of the apron are shown vertical, but may be inclined more or less.

Attached to the apron are horizontal cross-bars J, forming the heads of the rakes. I prefer to form the head-bars J with metal plates $j$ $j'$ respectively at the outer and inner sides. The teeth pass through these plates and are secured by riveting or by nuts. The outer plate, $j$, I form with longitudinal slots $j''$, through which the teeth K pass, and which allow a little side play to the points of the teeth, so that the teeth may give sidewise when they come in contact with the stalk of the plant. The teeth are rigid vertically, and are curved substantially as shown, so as to take a good hold of the cotton and draw it from the plant. The upper roller, G, gives motion to the apron and itself receives motion from the ground wheel or wheels by means of cross-belt L, extending from a pulley, G', on the shaft of roller G to a pulley, A', attached to the ground-wheel A. The shaft of roller G also carries a pulley, G², connected by a cross-belt, M', with a pulley, M, upon the shaft N' of the rotary brush N, mounted on extension F' of the standard, so as to give the brush the rotary movement in the direction shown by the arrows in Figs. 1 and 2. The brush clears the cotton from the rake-teeth K by means of its rapid rotation relatively to that of the roller G. As the cotton is taken from the teeth it is thrown down into the body B. The brush may be constructed with whipping-rods of rattan, steel, wire, or any other suitable material. In case any cotton should escape the brush, it is removed from the teeth by a fixed rake, O, whose teeth incline upward between the rake-teeth of the apron.

Depending from each of the tongues and extending near to the ground are guides P, whose lower edges incline so as to approach each other as they extend backwardly to elevate the stooping plants and draw them inward for proper presentation to the picker rake-teeth K. These guides may be made of sheet-iron or may be composed of iron frames.

R are runners which run forward upon the surface of the ground on each flank of the apron, and whose weight acts to prevent the uprooting of the plants by the upward draft of the rakes. The runners are hinged to standards or hangers R' and work in slotted guides R². These runners I do not regard as essential to the satisfactory operation of the machine.

S is the driver's seat.

In place of the pulleys A and G and belt L I may use chain or spur gearing or other suitable equivalent connections.

The stripper-brush being located near to the receiver, the cotton is deposited readily in the receptacle.

I claim as new and of my invention—

1. A cotton-harvester consisting of a body, B, supported on suitable wheels, standards F, roller G, mounted thereon, hangers H', having slots $h$, roller I, journaled therein, apron H, having rakes K, horizontal bars F', rotary stripping-brush N, pulleys G', G², M, and A', and belts L and M', the whole constructed and arranged substantially as set forth.

2. In a cotton-harvester, the combination of the rollers G and I, having recesses $g$ and $i$, the belt H, having cross-bars J, consisting of the outer and inner plates, $j\ j'$, and the teeth K, secured to said belt and cross-bars by riveting or by nuts and passing through the slots $j''$ in the outer plate, as and for the purpose set forth.

WILLIAM LEE.

Witnesses:
SAML. KNIGHT,
GEO. H. KNIGHT.